F. KÜHTZ.
BAKER'S OVEN.
APPLICATION FILED MAY 8, 1918.

1,408,360.

Patented Feb. 28, 1922.
2 SHEETS—SHEET 1.

Inventor:
Friedrich Kühtz
By Knight Bros. atty.

F. KÜHTZ.
BAKER'S OVEN.
APPLICATION FILED MAY 8, 1918.

1,408,360.

Patented Feb. 28, 1922.
2 SHEETS—SHEET 2.

Inventor:
Friedrich Kühtz
By Hughes Hughes atty.

UNITED STATES PATENT OFFICE.

FRIEDRICH KÜHTZ, OF CANNSTATT, GERMANY.

BAKER'S OVEN.

1,408,360.

Specification of Letters Patent.  Patented Feb. 28, 1922.

Application filed May 8, 1918. Serial No. 233,388.

*To all whom it may concern:*

Be it known that I, FRIEDRICH KÜHTZ, of 5 Teckstrasse, Cannstatt, in the Kingdom of Wurttemberg, German Empire, chief engineer, have invented certain new and useful Improvements in Bakers' Ovens (for which I have filed an application in Germany October 4, 1915,) of which the following is a specification.

My invention refers to bakers' ovens and more especially to ovens of the continuously working type. Its particular object is the production of bread and other similar products permitting only a short treatment with steam at the beginning.

As is well known the production of bread or the like from doughs consisting of rye alone or mixed with wheat has not been possible up till now in ovens of the continuously working type for the reason that these ovens consist of a single baking chamber rendering a short and intense action of the steam and a removal of the steam immediately thereafter impossible.

In the oven according to the present invention two separate chambers are provided and the plates or carriers carrying the loaves are made to pass first through one and then through the other chamber, steam being introduced into the first chamber, while the other chamber may be free of steam, as desired. Furthermore in the improved oven large plates may be used such as are employed in producing soldiers' bread or the like.

Figure 1:
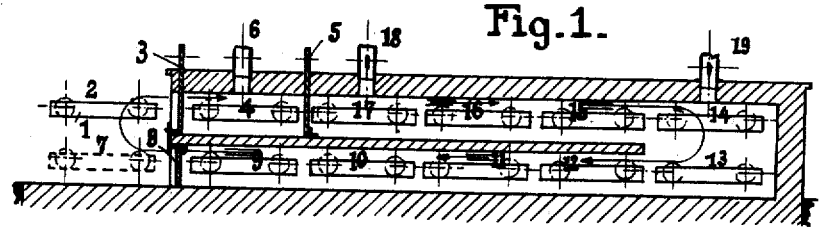
Figure 2:
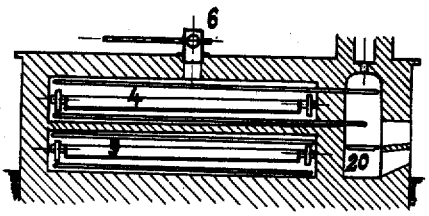
Figure 3:
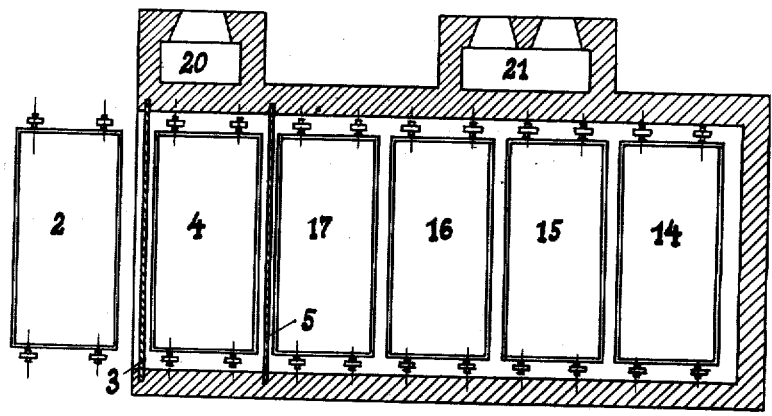
Figure 4:
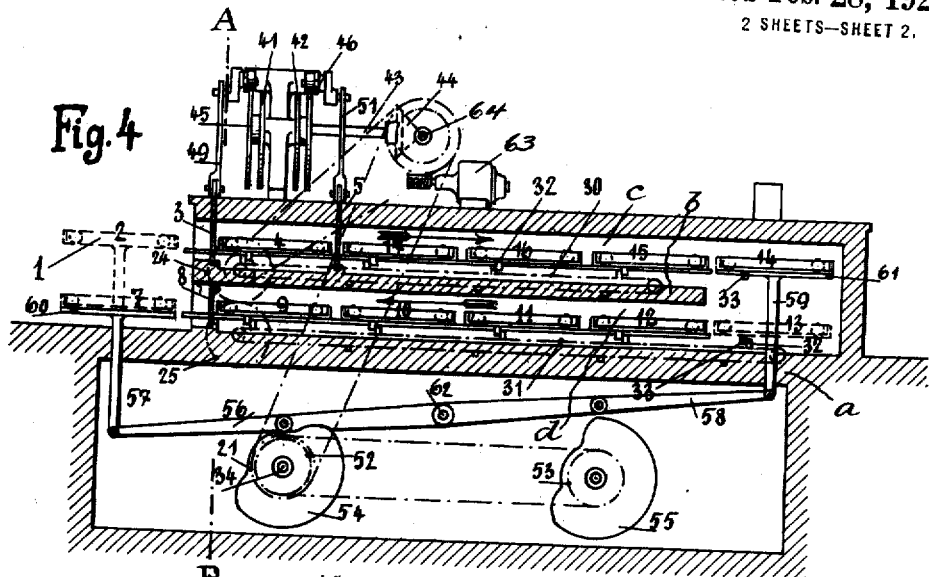
Figure 5:
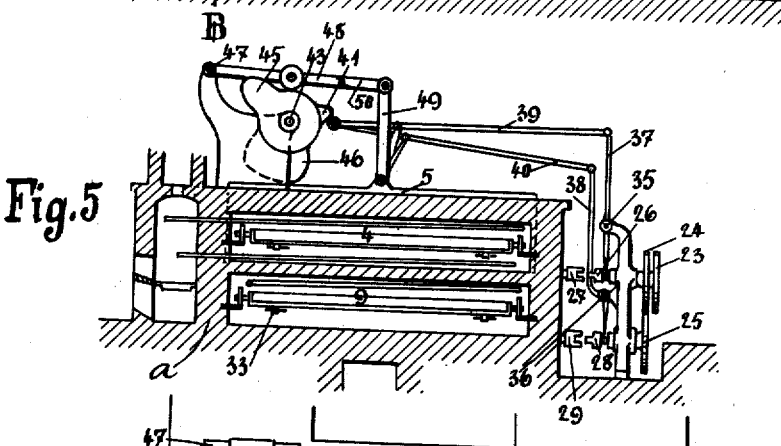
Figure 6:
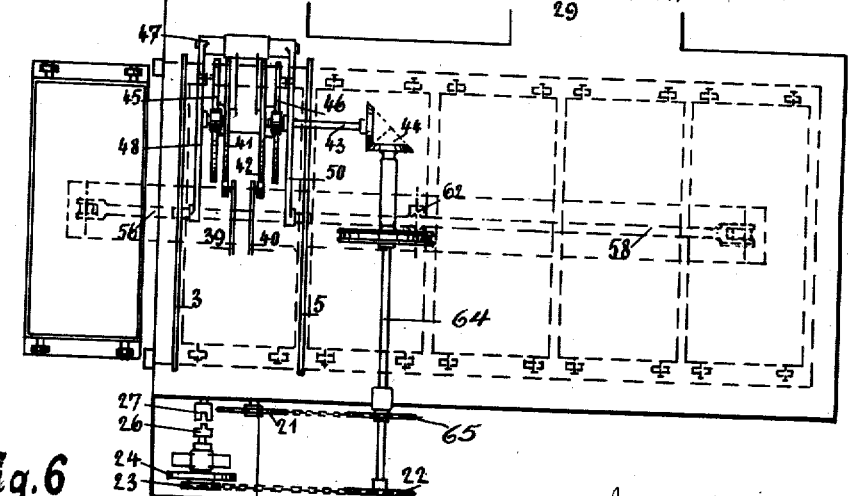

In the drawings affixed to this specification and forming part thereof the preferred form of an oven according to the present invention is illustrated, Fig. 1 being a purely diagrammatical longitudinal section, Fig. 2 a vertical cross section, Fig. 3 a horizontal section, Fig. 4 a vertical longitudinal section showing the operating mechanism, Fig. 5 a vertical cross section on the line A—B,

Fig. 6 a plan.

Referring to the drawings, $a$ is the oven structure consisting for instance of masonry; $b$ is a horizontal partition extending from the forward end of said structure back to the rear end, but leaving room at this end for the passage of the loaf-carriers or baking plates. The oven is thus divided into two superposed compartments $c$ $d$. 1 are the loaf-carriers or plates to be charged with the loaves at 2. 3 is the inlet of the upper compartment $c$, 4 is the first or pre-baking chamber, 5 is a closure in the form of a movable partition slide or the like forming the rear wall of said chamber. 6 is the steam valve allowing steam to enter into or to escape from said chamber. 18 and 19 are similar valves arranged above and communicating with the rear or main baking chamber. 8 is the door closing the opening of the lower compartment $d$. 20 and 21 are fireplaces or the like for heating the chambers of the oven by means of Perkin's tubes or the like.

63 is an electromotor serving to drive, by aid of a worm gear, shaft 64 carrying two chain wheels 65 and 22. Wheel 65 drives, by means of a chain, wheel 21 fixed on shaft 34; wheel 22 drives chain wheel 23, whose shaft carries, besides, a fixed toothed wheel 24 and a longitudinally movable claw coupling 26 secured against rotation on said shaft.

Toothed wheel 24 is in gearing with another toothed wheel 25 of a like diameter, whose shaft further carries a claw coupling 28 secured against rotation on said shaft, but adapted to be displaced longitudinally on said shaft.

The other half 27 of coupling 26 is located on a shaft carrying the disk of a transport chain 30. The other half 29 of coupling 28 is fixed on the shaft of the disk of a transport chain 31.

The chains 30 and 31 are provided with catches 32 adapted to act upon catches 33 fixed to the loaf-carriers 1. The couplings 26, 27 and 28, 29 are thrown in and out by means of double armed levers 37, 38 rotatably located at 35, 36 respectively. 39, 40 are connecting rods and 41, 42 are cam disks adapted to cooperate in actuating said levers. Cam disks 41, 42 are fixed on shaft 43 continuously driven from the main shaft 64 by aid of cog wheels 44.

Shaft 43 carries two more cam disks 45, 46. Disk 45 is adapted to act upon a lever 48 rotatably located at 47 and connected, by means of rod 49, to slide 3. Disk 46 is adapted to act upon a lever 50 connected, by means of a rod 51, to slide 5.

On shaft 34 there is fixed a cam disk 54 and, besides chain wheel 21, another chain wheel 52 driving, by means of a chain, another chain wheel 53.

On cam disk 54 there is resting, by aid of a roller or the like, a lever 56 rotatably located at 62, and carrying a standard 57 having a plate 60 fixed to its upper end.

On cam disk 55 there is resting another lever 58 located also at 62 and carrying a standard 59 having fixed to its upper end a plate 61.

Presuming the loaf carriers to occupy the positions shown in full lines in Fig. 4, the movements carried out by the different parts of the mechanism described are the following:

The cam disk 55 permanently rotating in the direction of the clock hand allows the roller of lever 58 to descend until the loaf carrier on plate 61 has passed from position 14 into position 13. Now cam disk 42 exerts pressure upon rod 40 and the upper part of lever 38, thereby causing coupling 28, 29 to be thrown in and transport chain 31 to be carried along by the permanently rotating wheel 25 in a direction opposite to that of the clock hand. During this movement the catches 32 fixed to the chain by pressing against the catches 33 fixed to the loaf carriers shift these latter in the direction of the arrow, until the carrier assuming position 9 has lifted flap 8 and reached position 7 on the plate 60, to be unloaded there.

Now cam disk 55 starts lifting lever 58 and plate 61 back into their initial position. Plate 60 is lifted at the same time by cam 54 acting upon lever 56, until the carrier placed upon it and provided with a fresh loaf assumes the position 2.

Thereupon disk 46 causes slide 5 to be lifted, by aid of lever 50, into its uppermost position. Disk 41 then causes rod 39 and lever 37 to throw coupling 26, 27 in until the catches 32 of the chain 30 which is now rotating have carried the loaf carriers disposed above them along in the direction of the arrow, until the carrier occupying the position 4 has passed from the steam chamber into position 17 and the carrier at 15 into position 14 on plate 61.

Disk 41 now allows coupling 26, 27 to be thrown out, while disk 46 allows slide 5 to descend into its closed position. By aid of lever 48 and rod 49 disk 45 then opens slide 3 until the carrier at 2 carrying the fresh loaf has been shoved into position 4.

The whole cycle of movements is then gone through afresh.

The space between points 9 and 17 is free of steam, the steam escapes at 18, 19 being opened to this effect so as to allow the steam developed from the bread during the period of baking to escape into the outer air, the transport of the steam being assisted, if necessary, by a current of fresh air, which may be introduced at the opposite end, say at 9, through a special air slide or by opening flap 8 a little.

The oven according to the present invention can be adapted without difficulty to the production of a different kind of bread.

If it is desired, for instance, to bake bread from wheat or of any other composition requiring a permanent action of steam, the steam escapes at 6, 18, 19 are kept closed. On the other hand, in baking bread requiring no steam they may be kept permanently open.

The heating of the oven by means of Perkin's tubes or the like is preferably effected by heating chamber 4 separately at 20, while the remaining parts of the interior of the oven are heated at 21 or else by means of several separate heating devices. In this manner the oven allows of being adapted to the most sensitive kinds of dough as well as far as the action of steam is concerned as also with regard to temperature, the vertical cycle of movements rendering possible a correct distribution of the temperature, viz. the highest in entering and the lowest in leaving the oven. By providing that either slide 3 or slide 5 and flap 8 can be opened, no injurious strong air current can be created and no heat will be allowed to escape at 3.

The oven further lends itself with advantage to the drying and roasting of various materials, the length of the inner chambers and the great number of carriers allowing to adapt it to every kind of work.

The different movements of parts are preferably effected from a central source of power by aid of a common controllable mechanism. The steam escape may be effected in a manner differing from that described. In case that the distribution of heat within the oven is of no avail, the carriers might as well be run through it in a direction opposite to that of the arrow.

The mechanism shown and described for moving the loaf carriers and the slides may be replaced by different mechanism without departing from the spirit of my invention.

I claim:—

1. In an oven, in combination, an oven chamber, an inlet and an outlet for said chamber, closures for said inlet and said outlet, a removable partition adapted to divide said oven chamber into pre-baking and main-baking chambers, carriers for the material under treatment, means for conveying said carriers in a closed circle through the oven from said inlet to said outlet and then to said inlet, and means for successively removing and replacing said closures and partition to permit said conveyance.

2. In an oven, in combination, an oven chamber, having a separate inlet and outlet, closures for said inlet and said outlet, removable means for dividing said oven into pre-baking and main-baking chambers, means for periodically opening said inlet and outlet and removing said dividing means, and means for periodically moving the material under treatment through said oven chamber.

3. In an oven, in combination, an oven chamber having a separate inlet and outlet, closures for said inlet and said outlet, removable means for dividing said oven into pre-baking and main-baking chambers, means for periodically opening said inlet and said outlet and removing said dividing means, means for periodically moving the material under treatment through the oven chamber, and means for actuating all said means from a common source.

4. In an oven, in combination, an oven chamber divided into two superposed compartments connected at one end, an inlet at one end of the upper compartment and an outlet at the adjacent end of the lower compartment, a removable partition in one compartment for dividing the oven chamber into pre-baking and main-baking chambers, means for conveying the material to be treated through said compartments from said inlet to said outlet, and means for removing said partition to permit said conveyance.

5. In an oven, in combination, an oven chamber divided into upper and lower compartments in communication with each other at one end, a removable partition in one of said compartments adapted to further divide said chamber into pre-baking and main-baking chambers, and separate heating means for said pre-baking and said main-baking chambers.

6. In an oven, in combination, an oven chamber divided into connected upper and lower compartments, a pre-baking chamber formed in one end of said upper compartment, means for admitting heat to the lower compartment, and means for admitting steam to the pre-baking chamber.

7. In an oven, in combination, an oven chamber divided into connected upper and lower compartments, a pre-baking chamber formed in one end of said upper compartment, means for admitting heat to the lower compartment, means for admitting steam to the pre-baking chamber, and means for advancing the material under treatment successively through said pre-baking chamber and the upper and lower compartments.

8. In an oven, in combination, an oven chamber divided into connected upper and lower compartments, a removable partition in said upper compartment forming a pre-baking chamber therein, means for admitting heat to the lower compartment, means for admitting steam to the pre-baking chamber, and means for periodically advancing the material under treatment successively through said pre-baking chamber and the upper and lower compartments and for periodically removing said partition to permit such advance.

9. In an oven, in combination, an oven chamber divided into connected upper and lower compartments, an inlet for said chamber, a closure for said inlet, a removable partition in said upper compartment forming a pre-baking chamber therein, means for admitting heat to the lower compartment, means for admitting steam to the pre-baking chamber, and means for periodically removing said partition and closure and for periodically advancing the material under treatment successively through said pre-baking chamber and the upper and lower compartments.

In testimony whereof I affix my signature, in presence of two witnesses.

FRIEDRICH KÜHTZ.

Witnesses:
 Yojanna Haug,
 Emilie Dreyle.